United States Patent
Matsumori et al.

(10) Patent No.: US 10,513,137 B2
(45) Date of Patent: Dec. 24, 2019

(54) THERMOSENSITIVE RECORDING MEDIUM

(71) Applicant: Nippon Paper Industries Co., Ltd., Tokyo (JP)

(72) Inventors: Yasuaki Matsumori, Tokyo (JP); Akihito Ogino, Tokyo (JP); Yoshimi Midorikawa, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 15/735,048

(22) PCT Filed: Jun. 16, 2016

(86) PCT No.: PCT/JP2016/067901
§ 371 (c)(1),
(2) Date: Dec. 8, 2017

(87) PCT Pub. No.: WO2016/204215
PCT Pub. Date: Dec. 22, 2016

(65) Prior Publication Data
US 2018/0178570 A1    Jun. 28, 2018

(30) Foreign Application Priority Data

Jun. 16, 2015 (JP) .................. 2015-120714

(51) Int. Cl.
| | |
|---|---|
| *B41M 5/333* | (2006.01) |
| *B41M 5/323* | (2006.01) |
| *B41M 5/337* | (2006.01) |
| *C09D 129/04* | (2006.01) |
| *C08K 3/36* | (2006.01) |
| *C08K 5/41* | (2006.01) |

(52) U.S. Cl.
CPC .......... *B41M 5/3336* (2013.01); *B41M 5/323* (2013.01); *B41M 5/3333* (2013.01); *B41M 5/3377* (2013.01); *C09D 129/04* (2013.01); B41M 2205/40 (2013.01); C08K 3/36 (2013.01); C08K 5/41 (2013.01)

(58) Field of Classification Search
CPC .. B41M 5/333; B41M 5/3333; B41M 5/3335; B41M 5/3336; B41M 2205/04
USPC ........................................... 503/216
See application file for complete search history.

(56) References Cited

U.S. PATENT DOCUMENTS

| | | | |
|---|---|---|---|
| 3,297,447 A | 1/1967 | McVeigh | |
| 8,129,307 B2 | 3/2012 | Makihara et al. | |
| 8,247,347 B2 | 8/2012 | Takagi et al. | |
| 8,283,284 B2 | 10/2012 | Hirai et al. | |
| 8,466,085 B2 | 6/2013 | Kato et al. | |
| 8,492,308 B2 | 7/2013 | Kurihara et al. | |
| 8,609,582 B2 | 12/2013 | Hirai et al. | |
| 8,673,812 B2 | 3/2014 | Ohse et al. | |
| 8,722,576 B2 | 5/2014 | Hayakawa et al. | |
| 9,579,916 B2 | 2/2017 | Matsumori et al. | |
| 2004/0156951 A1 | 8/2004 | van Krieken et al. | |
| 2010/0099557 A1 | 4/2010 | Makihara et al. | |
| 2011/0269622 A1 | 11/2011 | Ohse et al. | |
| 2017/0129266 A1 | 5/2017 | Ogino et al. | |
| 2018/0311987 A1 | 11/2018 | Matsumori et al. | |

FOREIGN PATENT DOCUMENTS

| | | |
|---|---|---|
| EP | 2033799 A1 | 3/2009 |
| JP | S52-106907 A | 9/1977 |
| JP | 52-123710 A | 10/1977 |
| JP | S58011193 A | 1/1983 |
| JP | 58-082788 | 5/1983 |
| JP | S60-101171 A | 11/1983 |
| JP | S59-33189 A | 2/1984 |
| JP | 3-288692 A | 12/1991 |
| JP | 7-179037 A | 7/1995 |
| JP | H08-59603 A | 3/1996 |
| JP | 10-217615 | 8/1998 |
| JP | 10-258577 A | 9/1998 |
| JP | H10-258577 A | 9/1998 |
| JP | 11-272133 A | 10/1999 |
| JP | 2000-143611 A | 5/2000 |
| JP | 2000-168239 A | 6/2000 |
| JP | 2001-310561 A | 11/2001 |
| JP | 2001-347757 A | 12/2001 |
| JP | 2002-178645 A | 6/2002 |
| JP | 2002-178646 A | 6/2002 |
| JP | 2002-301873 A | 10/2002 |

(Continued)

OTHER PUBLICATIONS

Machine translation of detailed description of JP 2003-266946 acquired on Jun. 2, 2019.*
International Search Report and Written Opinion of the International Searching Authority corresponding to international application PCT/JP2016/067901 dated Aug. 23, 2016.
Extended European Search Report corresponding to European Patent Application No. 16857454.9 dated Oct. 4, 2018.
Notification of Transmittal of IPRP with Written Opinion corresponding to International Application No. PCT/JP2016/067901 dated Dec. 28, 2017.
IPRP with Written Opinion and International Search Report corresponding to International Application No. PCT/JP2016/080926 dated Apr. 24, 2018.

(Continued)

*Primary Examiner* — Gerard Higgins
(74) *Attorney, Agent, or Firm* — Jenkins, Wilson, Taylor & Hunt, P.A.

(57) ABSTRACT

The objective of the present invention is to provide a thermosensitive recording medium excellent in color developing property, especially excellent in bar code readability, under severe environment. Provided is a thermosensitive recording medium having a thermosensitive recording layer comprising a colorless or pale colored electron donating leuco dye and an electron accepting color developing agent on a substrate, wherein the thermosensitive recording layer contains a specific sulfone compound and a specific urea-urethane-based compound in a specific ratio.

1 Claim, No Drawings

(56) References Cited

FOREIGN PATENT DOCUMENTS

| | | |
|---|---|---|
| JP | 2003-072246 A | 3/2003 |
| JP | 2003-154760 | 5/2003 |
| JP | 2003-154760 A | 5/2003 |
| JP | 2003-165276 A | 6/2003 |
| JP | 2003-266946 | 9/2003 |
| JP | 3635399 B2 | 4/2005 |
| JP | 2005-280107 A | 10/2005 |
| JP | 2006-264255 A | 10/2006 |
| JP | 2007-125744 A | 5/2007 |
| JP | 2013199054 A | 10/2013 |
| JP | 6211744 B2 | 9/2017 |
| WO | WO 97/16420 A1 | 5/1997 |
| WO | WO 00/14058 A1 | 3/2000 |
| WO | WO 02/081229 A1 | 10/2002 |
| WO | WO 2004/002748 A1 | 10/2005 |
| WO | WO2014/143174 A1 | 9/2014 |
| WO | WO/2017/069141 | 4/2017 |

OTHER PUBLICATIONS

Notice of Rejection Reason corresponding to Japanese Patent No. 6211744 dated Jul. 11, 2018.
Extended European Search Report corresponding to European Patent Application No. 16811689.5 dated Feb. 4, 2019.
Notice of Allowance corresponding to U.S. Appl. No. 15/770,053 dated Jun. 25, 2019.

* cited by examiner

THERMOSENSITIVE RECORDING MEDIUM

FIELD OF THE INVENTION

The present invention relates to a thermosensitive recording medium for recording image by utilizing a coloring reaction between a colorless or pale colored electron donating leuco dye (referred to as "leuco dye") and an electron accepting color developing agent (referred to as "color developing agent"), which is excellent in color developing property, especially excellent in bar code readability, under severe environment.

BACKGROUND OF THE INVENTION

Thermosensitive recording media are ordinarily prepared by mixing together a leuco dye and a color developing agent, such as a phenolic compound and the like, after grinding them into fine particles, preparing a coating solution by adding a binder, a filler, a sensitizer, a slipping agent and other aids to the mixture and applying the coating solution onto a substrate such as paper, synthetic paper, film, plastic and the like. Thermosensitive recording medium develops color through an instantaneous chemical reaction when heated by a thermal head, hot stamp, hot pen, laser light or the like to yield a recorded image. Such thermosensitive recording media are used extensively in recording media such as facsimile devices, computer terminal printers, automatic ticket dispensers, recorders for meters, receipts at super markets and convenience stores and the like.

In recent years, the use of the thermosensitive recording medium is expanding, such as various ticket, receipts, labels, ATM of Bank, meter reading of gas and electricity, cash vouchers, such as car racing or horseracing betting. Then thermosensitive recording medium has been required to have a good preservation property of an image portion and a blank portion under severe environment such as high temperature condition like in a car in mid-summer.

It is generally known to install a protective layer on the thermosensitive recording layer to improve the preservation property of the image portion of the thermosensitive recording medium.

However, when installing a protective layer on a thermosensitive recording layer, the protective layer absorbs the thermal energy given from the thermal head, so that the color developing property, that is color developing sensitivity and image quality, especially bar code readability, are deteriorated. In particular, when the color developing sensitivity is deteriorated and then the density difference between the recorded portion and the blank portion becomes smaller, and the barcode can not be properly read by a reading machine, even if it is visually readable. Then there has been a problem in the bar code readability.

On the other hand, thermosensitive recording media utilizing specific combinations of color developing agents and stabilizers to improve the preservation property of the image portion (References 1 and 2), and thermosensitive recording media utilizing specific combinations of sensitizers and stabilizers to improve the preservation property of the image portion (Reference 3) have been disclosed.

Further, thermosensitive recording media utilizing a combination of two specific color developing agents to improve the color developing property and the preservation property of the image portion (Reference 4) and thermosensitive recording media utilizing a combination of two specific color developing agents of urea-urethane-based compound and BPS based color developing agent to improve the preservation property (References 5 to 8) are disclosed.

REFERENCES

Reference 1: Japanese Patent Application Public Disclosure 2003-154760
Reference 2: Japanese Patent Application Public Disclosure 2001-347757
Reference 3: International Publication WO2004/002748
Reference 4: Japanese Patent Application Public Disclosure 2006-264255
Reference 5: Japanese Patent Application Public Disclosure 2002-178646
Reference 6: Japanese Patent Application Public Disclosure 2002-178645
Reference 7: Japanese Patent Application Public Disclosure 2000-143611
Reference 8: International Publication WO00/014058

Problems to be Solved by the Invention

In the case where a thermosensitive recording medium is used in the above-mentioned applications, such as labels, tickets, and the like under severe environment, the preservation property of the image portion and the blank portion is not sufficient.

Furthermore, as the thermosensitive recording media utilizing a combination of two specific color developing agents (Reference 4) and the like are inferior in heat resistance of the blank portion, so the blank portion develops color under severe environment, then the bar code readability becomes insufficient.

In addition, the properties of the thermosensitive recording media utilizing a combination of two specific color developing agents of urea-urethane-based compound and BPS based color developing agent (References 5 to 8) and the like are largely varied depending on the compound and the color developing agent used for the combination.

Accordingly, it is an objective of the present invention to provide a thermosensitive recording medium which is excellent in color developing property, especially excellent in bar code readability, under severe environment. In the present invention, the severe environment means, for example, high temperature and/or high humidity conditions, and the high temperature refers to, for example, 70 degree C. or higher, and the high humidity refers to, for example, 80% RH or higher.

Means to Solve the Problems

As a result of intensive studies, the present inventors have found that the above problems can be solved by incorporating two specific color developing agents in a specific ratio in a thermosensitive recording layer of a thermosensitive recording medium, and then completed the present invention.

That is, the present invention provides a thermosensitive recording medium having a thermosensitive recording layer comprising a colorless or pale colored electron donating leuco dye and an electron accepting color developing agent on a substrate, wherein the thermosensitive recording layer contains a sulfone compound represented by the general formula 1 and an urea-urethane-based compound represented by the general formula 2 as the electron accepting color developing agent, wherein the content of the urea-urethane-based compound represented by the general formula 2 is from 0.01 to 1.1 parts by weight per 1 part by weight of the sulfone compound represented by the general formula 1.

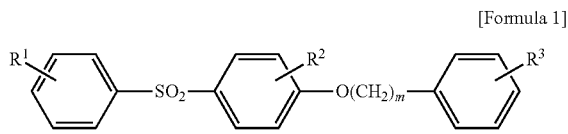

[Formula 1]

wherein $R^1$ represents a hydrogen atom or a hydroxyl group, $R^2$ and $R^3$, which may be identical to or different from the others, represent a hydrogen atom or an alkyl group or an alkoxy group, having 1-6 carbon atoms, and m represents an integer of 1 to 3,

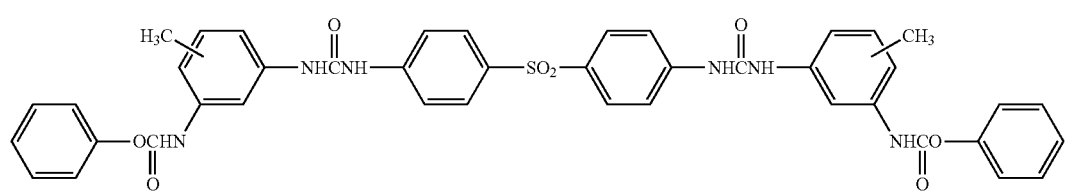

[Formula 2]

Advantages of the Present Invention

According to the present invention, provided is a thermosensitive recording medium having an excellent color developing property, especially excellent bar code readability, even under severe environment.

DETAILED DESCRIPTION OF THE INVENTION

The thermosensitive recording medium of the present invention comprises a thermosensitive recording layer comprising a colorless or pale colored electron donating leuco dye and an electron accepting color developing agent on a substrate, wherein the thermosensitive recording layer contains a specific sulfone compound and a specific urea-urethane-based compound in a specific ratio.

The sulfone compound used in the present invention is represented by the general formula 1 (Formula 1).

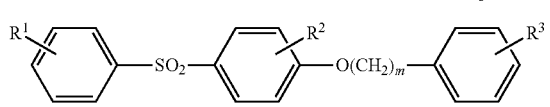

[Formula 1]

In the above formula (Formula 1), $R^1$ represents a hydrogen atom or a hydroxyl group, preferably a hydroxyl group.

$R^2$ and $R^3$, which may be identical to or different from the others, represent a hydrogen atom or an alkyl group or an alkoxy group, in which the alkyl group or the alkoxy group has 1-6, preferably 1-3 carbon atoms. More preferably, at least one of $R^2$ and $R^3$ represents a hydrogen atom, further preferably, both of $R^2$ and $R^3$ are hydrogen atoms.

m represents an integer of 1 to 3, preferably 1 or 2, more preferably 1.

As this alkyl group, linear or branched alkyl groups having 1 to 6 carbon atoms are mentioned, which include, for example, methyl group, ethyl group, propyl group, isopropyl group, butyl group, isobutyl group, sec-butyl group, tert-butyl group, pentyl group, isopentyl group, neopentyl group, tert-pentyl group, 1-methylbutyl group, 2-methylbutyl group, 1,2-dimethylpropyl group, hexyl group, isohexyl group, 1-methylpentyl group, 2-methylpentyl group, 3-methylpentyl group, 1,1-dimethylbutyl group, 1,2-dimethylbutyl group, 2,2-dimethylbutyl group, 1,3-dimethylbutyl group, 2,3-dimethylbutyl group, 3,3-dimethylbutyl group, 1-ethylbutyl group, 2-ethylbutyl group, 1,1,2-trimethylpropyl group, 1,2,2-trimethylpropyl group, 1-ethyl-1-methylpropyl group, 1-ethyl-2-methylpropyl group and the like. The alkyl group is preferably an alkyl group having 1 to 3 carbon atoms, such as methyl group, ethyl group, propyl group and isopropyl group.

As this alkoxy group, linear or branched alkoxy groups having 1 to 6 carbon atoms are mentioned, which include, for example, methoxy group, ethoxy group, propoxy group, isopropoxy group, butoxy group, isobutoxy group, sec-butoxy group, tert-butoxy group, pentyloxy (amyloxy) group, isopentyloxy group, tert-pentyloxy group, neopentyloxy group, 2-methylbutoxy group, 1,2-dimethylpropoxy group, 1-ethylpropoxy group, hexyloxy group. The alkoxy group is preferably methoxy group, ethoxy group, propoxy group, or isopropoxy group.

The preferable sulfone compound used in the present invention is represented by the general formula 3 (Formula 3).

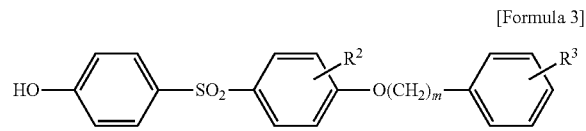

[Formula 3]

wherein $R^2$, $R^3$ and m are as defined above.

More preferable sulfone compound used in the present invention includes
4-hydroxy-4'-benzyloxydiphenylsulfone, 4-hydroxy-4'-phenethyloxydiphenylsulfone,
4-hydroxy-4'-(3-phenylpropoxy) diphenylsulfone, most preferably
4-hydroxy-4'-benzyloxydiphenylsulfone (represented by the following formula 4 (Formula 4)).

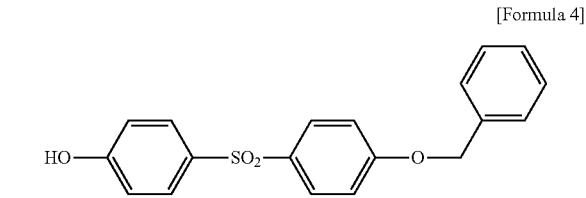

[Formula 4]

The urea-urethane-based compound used in the present invention is represented by the general formula 2 (Formula 2).

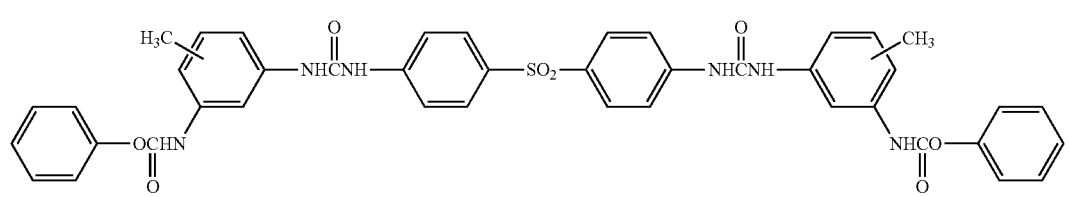

[Formula 2]

When the thermosensitive recording layer of the present invention contains a sulfone compound represented by the general formula 1 and an urea-urethane-based compound represented by the general formula 2 as the electron accepting color developing agent, the oxygen atom of the aralkyloxy group of the sulfone compound incorporates the pai electrons from the aralkyl group so that the electronegativity becomes higher, which therefore exhibits basicity upon heating and melting.

In the basic environment, the urea-urethane-based compound tends to become an enol type, so the efficiency of the reaction between the urea urethane compound and the leuco dye is particularly enhanced, then the electron transfer complex is easily formed and the reverse reaction hardly occurs. The resulted thermosensitive recording medium is supposed to be excellent in color developing property, especially excellent in bar code readability, and further the blank portion is excellent in heat resistance.

The urea-urethane-based compound, used as the color developing agent in the present invention, includes specifically three kinds of compounds represented by the following formulas, Formula 5 to Formula 7. These may be used individually or as a mixture of at least two of them.

In the present invention, the thermosensitive recording layer of the present invention contains, as the electron accepting color developing agent, from 0.01 to 1.1 parts by weight of the urea-urethane-based compound represented by the general formula 2 per 1 part by weight of the sulfone compound represented by the general formula 1. Further, the thermosensitive recording layer contains preferably 0.05 parts by weight or more, more preferably 0.1 parts by weight or more of the urea-urethane-based compound per 1 part by weight of the sulfone compound. Furthermore, the thermosensitive recording layer contains preferably 1.0 parts by weight or less, more preferably 0.5 parts by weight or less, further preferably less than 0.5 parts by weight of the urea-urethane-based compound per 1 part by weight of the sulfone compound.

As the ratio of the urea-urethane-based compound represented by the general formula 2 to the sulfone compound represented by the general formula 1 is within this range, the thermosensitive recording medium becomes excellent in color developing property, especially excellent in bar code readability, under severe environment (see Examples below). When the content of the urea-urethane-based compound represented by the general formula 2 is less than 0.01 parts by weight per 1 part by weight of the sulfone compound represented by the general formula 1, the bar code readability tends to be insufficient. And when the content of

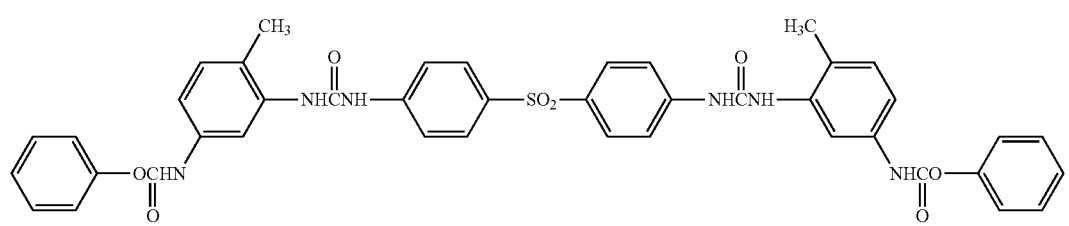

[Formula 5]

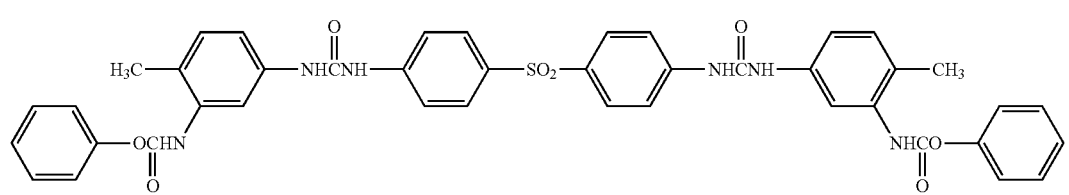

[Formula 6]

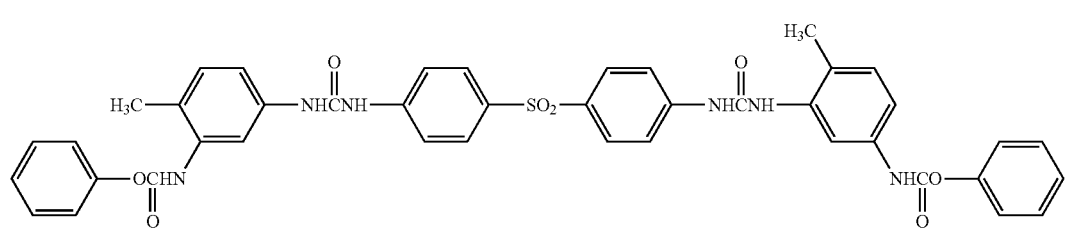

[Formula 7]

the urea-urethane-based compound exceeds 1.1 parts by weight per 1 part by weight of the sulfone compound, the whiteness of the blank portion may deteriorate.

The thermosensitive recording layer of the present invention may contain color developing agents other than the sulfone compound represented by the general formula 1 and the urea-urethane-based compound represented by the general formula 2. In this case, the total amount of the sulfone compound represented by the general formula 1 and the urea-urethane-based compound represented by the general formula 2 is preferably 50% by weight or more, more preferably 70% by weight or more, further preferably 90% by weight or more, and particularly preferably 100% by weight (which means that all of the color developing agents contained in the thermosensitive recording layer are the sulfone compound represented by the general formula 1 and the urea-urethane-based compound represented by the general formula 2.) of the total amount of the color developing agents contained in the thermosensitive recording layer, which contains the sulfone compound represented by the general formula 1 and the urea-urethane-based compound represented by the general formula 2.

As the color developing agents other than the sulfone compound represented by the general formula 1 and the urea-urethane-based compound represented by the general formula 2, for example, activated clay, attapulgite, colloidal silica, inorganic acidic substances such as aluminum silicate and the like, 4,4'-isopropylidene diphenol, 1,1-bis(4-hydroxyphenyl) cyclohexane, 2,2-bis(4-hydroxyphenyl)-4-methylpentane, 4,4'-dihydroxydiphenyl sulfide, hydroquinone monobenzyl ether, benzyl 4-hydroxybenzoate, 4,4'-dihydroxy diphenyl sulfone, 2,4'-dihydroxy diphenyl sulfone, 4-hydroxy-4'-isopropoxy diphenyl sulfone, 4-hydroxy-4'-n-propoxy diphenyl sulfone, 4-hydroxy-4'-allyloxy diphenyl sulfone, bis(3-allyl-4-hydroxyphenyl) sulfone, 4-hydroxy-4'-methyldiphenyl sulfone, 3,4-dihydroxyphenyl-4'-methyl phenyl sulfone, 1-[4-(4-hydroxyphenyl-sulfonyl) phenoxy]-4-[4-(4-isopropoxyphenyl sulfonyl) phenoxy] butane, phenol condensate composition described in Japanese Patent Application Public Disclosure No. 2003-154760, aminobenzene sulfonamide derivatives described in Japanese Patent Application Public Disclosure No. H08-59603, bis(4-hydroxyphenyl thioethoxy) methane, 1,5-di(4-hydroxyphenyl thio)-3-oxapentane, butyl bis(p-hydroxyphenyl) acetate, methyl bis(p-hydroxyphenyl) acetate, 1,1-bis(4-hydroxyphenyl)-1-phenyl ethane, 1,4-bis[α-methyl-α-(4'-hydroxyphenyl)ethyl] benzene, 1,3-bis[α-methyl-α-(4'-hydroxyphenyl)ethyl] benzene, di(4-hydroxy-3-methylphenyl) sulfide, 2,2'-thiobis(3-tert-octylphenol), 2,2'-thiobis(4-tert-octylphenol), phenolic compounds such as diphenyl sulfone crosslinked compounds and the like described in International Publication WO97/16420, compounds described in International Publication WO02/081229 or Japanese Patent Application Public Disclosure No. 2002-301873, thiourea compounds such as N,N'-di-m-chlorophenyl thiourea and the like, p-chlorobenzoic acid, stearyl gallate, bis[zinc 4-octyloxy carbonylamino salicylate] dihydrate, 4-[2-(p-methoxyphenoxy) ethyloxy] salicylic acid, 4-[3-(p-tolylsulfonyl) propyloxyl salicylic acid, aromatic carboxylic acids such as 5-[p-(2-p-methoxyphenoxyethoxy) cumyl] salicylic acid, and salts of these aromatic carboxylic acids and polyvalent metals such as zinc, magnesium, aluminum, calcium, titanium, manganese, tin, nickel and the like, and, furthermore, antipirin complexes of zinc thiocyanate and complex zinc salts of terephthal aldehyde acid with other aromatic carboxylic acids and the like may be cited.

These color developing agents may be used individually or as a mixture of at least two of them.

1-[4-(4-hydroxyphenyl-sulfonyl) phenoxy]-4-[4-(4-isopropoxyphenyl sulfonyl) phenoxy] butane is available, for example, under the trade name of JKY-214 produced by API Corporation. The phenol condensate composition described in Japanese Patent Application Public Disclosure No. 2003-154760 is available, for example, under the trade name of JKY-224 produced by API Corporation. The diphenylsulfone crosslinked type compound described in International Publication WO97/16420 is available, for example, under the trade name of D-90 produced by Nippon Soda Co., Ltd. The compound described in International Publication WO02/081229 is available, for example, under the trade names of NKK-395 and D-100 produced by Nippon Soda Co., Ltd. In addition, high molecular weight aliphatic acid metal complex salts described in Japanese Patent Application Public Disclosure No. H10-258577 and metal chelate type color developing components such as polyvalent hydroxy aromatic compounds and the like may also be present.

The various materials used in the thermosensitive recording layer of the thermosensitive recording medium of the present invention are shown below. These materials, such as binders, crosslinking agents, pigments and the like, may be used also for other coating layer(s) other than the thermosensitive recording layer, such as the protective layer and the undercoat layer, unless the desired effects for the problems described above are not hampered.

All of the leuco dyes well known in the conventional field of pressure sensitive and thermosensitive recording media may be used as the electron donating leuco dye in the present invention. Although the leuco dye is not particularly restricted, triphenylmethane type compounds, fluorane type compounds, fluorene type compounds, divinyl type compounds and the like are preferred as the leuco dye. Specific examples of the typical colorless to pale colored basic colorless leuco dye (leuco dye precursors) are shown below. In addition, these leuco dye precursors may be used individually and also in mixtures of at least two of them.

<Triphenylmethane Type Leuco Dyes>

3,3-bis(p-Dimethyl aminophenyl)-6-dimethylaminophthalide [alternate name: crystal violet lactone] and 3,3-bis(p-Dimethyl aminophenyl) phthalide [alternate name: malachite green lactone]

<Fluorane Type Leuco Dyes>

3-Diethylamino-6-methylfluorane, 3-diethylamino-6-methyl-7-anilinofluorane, 3-diethylamino-6-methyl-7-(o, p-dimethylanilino)fluorane, 3-diethylamino-6-methyl-7-chlorofluoran, 3-diethylamino-6-methyl-7-(m-trifluoromethylanilino) fluorane, 3-diethylamino-6-methyl-7-(o-chloroanilino) fluorane, 3-diethylamino-6-methyl-7-(p-chloroanilino) fluorane, 3-diethylamino-6-methyl-7-(o-fluoroanilino) fluorane, 3-diethylamino-6-methyl-7-(m-methylanilino) fluorane, 3-diethylamino-6-methyl-7-n-octylanilino fluorane, 3-diethylamino-6-methyl-7-n-octylamino fluorane, 3-diethylamino-6-methyl-7-benzylamino fluorane, 3-diethylamino-6-methyl-7-dibenzylamino fluorane, 3-diethylamino-6-chloro-7-methyl fluorane, 3-diethylamino-6-chloro-7-anilino fluorane, 3-diethylamino-6-chloro-7-p-methylanilino fluorane, 3-diethylamino-6-ethoxyethyl-7-anilino fluorane, 3-diethylamino-7-methyl fluorane, 3-diethylamino-7-chloro fluorane, 3-diethylamino-7-(m-trifluoromethylanilino) fluorane, 3-diethylamino-7-(o-chloroanilino) fluorane, 3-diethylamino-7-(p-chloroanilino) fluorane, 3-diethylamino-7-(o-fluoroanilino) fluorane, 3-diethylamino-benz[a] fluorane, 3-diethylamino-benz[c] fluorane, 3-dibutylamino-6-methyl-fluorane, 3-dibutylamino-6-methyl-7-anilino fluorane, 3-dibutylamino-6-methyl-7-(o,p-dimethylanilino) fluorane, 3-dibutylamino-7-(o-chloroanilino) fluorane, 3-butylamino-6-methyl-7-(p-chloroanilino) fluorane, 3-dibutylamino-6-methyl-7-(o-fluoroanilino) fluorane, 3-dibutylamino-6-methyl-7-(m-fluoroanilino) fluorane, 3-dibutylamino-6-methyl-chloro fluorane, 3-dibutylamino-6-ethoxyethyl-7-anilino fluorane, 3-dibutylamino-6-chloro-7-anilino fluorane, 3-dibutylamino-6-methyl-7-p-methylanilino fluorane, 3-dibutylamino-7-(o-chloroanilino) fluorane, 3-dibutylamino-7-(o-fluoroanilino) fluorane, 3-di-n-pentylamino-6-methyl-7-anilino fluorane, 3-di-n-pentylamino-6-methyl-7-(p-chloroanilino) fluorane, 3-di-n-pentylamino-7-(m-trifluoromethylanilino) fluorane, 3-di-n-pentylamino-6-chloro-7-anilino fluorane, 3-di-n-pentylamino-7-(p-chloroanilino) fluorane, 3-pyrolidino-6-methyl-7-anilino fluorane, 3-piperidino-6-methyl-7-anilino fluorane, 3-(N-methyl-N-propylamino)-6-methyl-7-anilino fluorane, 3-(N-methyl-N-cyclohexylamino)-6-methyl-7-anilino fluorane, 3-(N-ethyl-N-cyclohexylamino)-6-methyl-7-anilino fluorane, 3-(N-ethyl-N-xylylamino)-6-methyl-7-(p-chloroanilino) fluorane, 3-(N-ethyl-p-toluidino)-6-methyl-7-anilino fluorane, 3-(N-ethyl-N-isoamylamino)-6-methyl-7-anilino fluorane, 3-(N-ethyl-N-isoamylamino)-6-chloro-7-anilino fluorane, 3-(N-ethyl-N-tetrahydrofurfurylamino)-6-methyl-7-anilino fluorane, 3-(N-ethyl-N-isobutylamino)-6-methyl-7-anilino fluorane, 3-(N-ethyl-N-ethoxypropylamino)-6-methyl-7-anilino fluorane, 3-cyclohexylamino-6-chloro fluorane, 2-(4-oxahexyl)-3-dimethylamino-6-methyl-7-anilino fluorane, 2-(4-oxahexyl)-3-diethylamino-6-methyl-7-anilino fluorane, 2-(4-oxahexyl)-3-dipropylamino-6-methyl-7-anilino fluorane, 2-methyl-6-o-(p-dimethylaminophenyl) aminoanilino fluorane, 2-methoxy-6-p-(p-dimethylaminophenyl) aminoanilino fluorane, 2-chloro-3-methyl-6-p-(p-phenylaminophenyl) aminoanilino fluorane, 2-chloro-6-p-(p-dimethylaminophenyl) aminoanilino fluorane, 2-nitro-6-p-(p-diethylaminophenyl) aminoanilino fluorane, 2-amino-6-p-(p-diethylaminophenyl) aminoanilino fluorane, 2-diethylamino-6-p-(p-diethylaminophenyl) aminoanilino fluorane, 2-phenyl-6-methyl-6-p-(p-phenylaminophenyl) aminoanilino fluorane, 2-benzyl-6-p-(p-phenylaminophenyl) aminoanilino fluorane, 2-hydroxy-6-p-(p-phenylaminophenyl) aminoanilino fluorane, 3-methyl-6-p-(p-dimethylaminophenyl) aminoanilino fluorane, 3-diethylamino-6-p-(p-diethylaminophenyl) aminoanilino fluorane, 3-diethylamino-6-p-(p-dibutylaminophenyl) aminoanilino fluorane and 2,4-dimethyl-6-[(4-dimethylamino) anilino]fluorane.

<Fluorene Type Leuco Dye>

3,6,6-Tris(dimethylamino) spiro[fluorane-9,3'-phthalide] and 3,6,6'-tris (diethylamino) spiro[fluorane-9,3'-phthalide].

<Divinyl Type Leuco Dyes>

3,3-bis-[2-(p-dimethylaminophenyl)-2-(p-methoxyphenyl) ethenyl]-4,5,6,7-tetrabromophthalide, 3,3-bis-[2-(p-dimethylaminophenyl)-2-(p-methoxyphenyl) ethenyl]-4,5,6,7-tetrachlorophthalide, 3,3-bis-[1,1-bis (4-pyrrolidinophenyl) ethylene-2-yl] 4,5,6,7-tetra-bromophthalide, 3,3-bis-[1-(4-methoxyphenyl)-1-(4-pyrrolidinophenyl) ethylene-2-yl]-4,5,6,7-tetrachlorophthalide <Others>

3-(4-Diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide, 3-(4-cyclohexyl ethylamino-2-methoxyphenyl)-3-(1-ethyl-2-methylindol-3-yl)-4-azaphthalide, 3,3-bis(1-ethyl-2-methylindol-3-yl)phthalide, 3,6-bis(diethylamino)fluorane-7-(3'-nitroanilinolactam, 3,6-bis(diethylamino)fluorane-γ-(4'-nitro) anilinolactam, 1,1-bis-[2',2',2",2"-tetrakis-(p-dimethylaminophenyl)-ethenyl]-2,2-dinitrilethane, 1,1-bis-[2',2',2",2"-tetrakis-(p-dimethylaminophenyl)-ethenyl]-2-ß-naphthoylethane, 1,1-bis-[2',2',2",2"-tetrakis-(p-dimethylaminophenyl)-ethenyl]-2,2-diacetylethane and bis-[2,2,2',2'-tetrakis-(p-dimethylaminophenyl)-ethenyl]-methylmalonic acid dimethyl ester.

The previously well known sensitizers may be used as the sensitizer in the thermosensitive recording medium of the present invention. As such sensitizers, aliphatic acid amides such as stearic acid amide, palmitic acid amide and the like, ethylene bis-amide, montan acid wax, polyethylene wax, 1,2-di-(3-methylphenoxy) ethane, p-benzyl biphenyl, 8-benzyloxy naphthalene, 4-biphenyl-p-tolyl ether, m-terphenyl, 1,2-diphenoxyethane, dibenzyl oxalate, di(p-chlorobenzyl) oxalate, di(p-methylbenzyl) oxalate, dibenzyl terephthalate, benzyl p-benzyloxy benzoate, di-p-tolyl carbonate, phenyl-α-naphthyl carbonate, 1,4-diethoxynaphthalene, 1-hydroxy-2-naphthoic acid phenyl ester, o-xylene-bis-(phenyl ether), 4-(m-methyl phenoxymethyl) biphenyl, 4,4'-ethylene dioxy-bis-benzoic acid dibenzyl ester, dibenzoyloxy methane, 1,2-di(3-methylphenoxy) ethylene, bis[2-(4-methoxy-phenoxy) ethyl] ether, methyl p-nitrobenzoate, phenyl p-toluene sulfonate, o-toluene sulfonamide, p-toluenesulfonamide, and the like may be listed as examples. These sensitizers may be used individually and as mixtures of at least two of them.

As a pigment used in the present invention, kaolin, calcined kaolin, calcium carbonate, aluminum oxide, titanium oxide, magnesium carbonate, aluminum silicate, magnesium silicate, calcium silicate, aluminum hydroxide, silica and the like may be used. These pigments may be used in combinations depending on the required quality.

As the binder used in the present invention, polyvinyl alcohols such as completely saponified polyvinyl alcohol, partially saponified polyvinyl alcohol; modified polyvinyl alcohols such as acetoacetylated polyvinyl alcohol, carboxyl-modified polyvinyl alcohol, amide-modified polyvinyl alcohol, sulfonic acid-modified polyvinyl alcohol, butyral-modified polyvinyl alcohol, olefin-modified polyvinyl alcohol, nitrile-modified polyvinyl alcohol, pyrolidone-modified polyvinyl alcohol, silicone-modified polyvinyl alcohol and the like; acrylic resins comprising (meth) acrylic acid and a monomer component copolymerizable with (meth) acrylic acid (excluding olefin); cellulose derivatives such as hydroxyethyl cellulose, methyl cellulose, ethyl cellulose, carboxymethyl cellulose, acetyl cellulose and the like; starches such as oxidized starch, etherified starch and esterified starch and the like; styrene-maleic anhydride copolymer; styrene-butadiene copolymer; casein; gum arabic; polyvinyl chloride; polyvinyl acetate; polyacrylamide; polyacrylic acid ester; polyvinyl butylal, polystyrol and their copolymers; silicone resins; petroleum resins; terpene resins; ketone resins; cumaron resins and the like may be listed as examples. The polymeric substances may be used upon dissolving them in a solvent such as water, alcohol, ketones, esters, hydrocarbons and the like or upon emulsifying or dispersing into a paste in water or other media. These polymeric materials may also be used in combinations according to the qualities demanded.

The content (in solid) of the binder in the thermosensitive recording layer is preferably about 5 to 25% by weight.

As the crosslinking agent used in the present invention, zirconium compounds such as zirconium chloride, zirconium sulfate, zirconium nitrate, zirconium acetate, zirconium carbonate, zirconium stearate, zirconium octylate, zirconium silicate, zirconium oxynitrate, potassium zirconium carbonate, ammonium zirconium carbonate; polyvalent aldehyde compounds such as glyoxal, glutaraldehyde, aldehyde starch; methylol melamine, melamine formaldehyde resin, melamine urea resin, polyamine epichlorohydrin resin, polyamide epichlorohydrin resin, potassium persulfate, ammonium persulfate, sodium persulfate, ferric chloride, magnesium chloride, borax, boric acid, alums (aluminum potassium sulfate), ammonium chloride, and the like may be cited.

As the slipping agent used in the present invention, fatty acid metal salts such as zinc stearate, calcium stearate, and the like; waxes; silicone resins; and the like may be cited.

Stabilizing agents that improve oil resistance of recorded images and the like, such as 4,4'-butylidene (6-t-butyl-3-methylphenol), 2,2'-di-t-butyl-5,5'-dimethyl-4,4'-sulfonyl diphenol, 1,1,3-tris (2-methyl-4-hydroxy-5-cyclohexylphenyl) butane, 1,1,3-tris (2-methyl-4-hydroxy-5-t-butylphenyl) butane and the like may also be added in the range that does not adversely affect the desired effects for the problems described above.

In addition, a benzophenone type and triazole type UV absorbers, dispersion agent, de-foaming agent, antioxidant, fluorescent dye and the like may also be used.

The types and amounts of the leuco dye, color developing agent, sensitizer and other various ingredients used in the thermosensitive recording medium of the present invention may be determined according to the required performance and printability. Although the amounts of the color developing agent, the sensitizer, the pigment, the stabilizing agent and the other ingredients are not particularly restricted, from 0.5 parts to 10 parts of the color developing agent, from 0.1 parts to 10 parts of the sensitizer, from 0.5 parts to 20 parts of the pigment, from 0.01 parts to 10 parts of the stabilizing agent and from 0.01 parts to 10 parts of the other ingredients are ordinarily used per 1 part of the leuco dye.

The leuco dye, the color developing agent and the other materials added as needed are finely ground into particles with several microns or smaller in size, by using a grinder or a suitable emulsification device such as a ball mill, attritor, sand grinder and the like. The coating solutions are prepared by adding a binder and various additives to these depending on the objective. Water, alcohol and the like can be used as the solvent for the coating solution and the solid content of the coating solution is about from 20 to 40 weight %.

The thermosensitive recording medium of the present invention may further have a protective layer on the thermosensitive recording layer.

The protective layer comprises mainly a binder and a pigment. As the binder used for the protective layer, the binders shown above as the materials that can be used for the thermosensitive recording layer may be used. These binders may be used alone or in combination of two or more.

Any generally used pigment may be used as the pigment in the protective layer. As the pigment, for example, inorganic pigment, such as calcium carbonate, silica, zinc oxide, titanium oxide, aluminum hydroxide, magnesium hydroxide, calcined kaolin, clay, talc the like may be used. These pigments may be used alone or in combination of two or more.

The content (in solid) of the pigments in the protective layer is preferably 20 weight % or more, more preferably from 20 to 80 weight %. In the case that the protective layer contains pigments, the total content (in solid) of the pigment and the binder is preferably about 30 to 300 parts by weight per 100 parts by weight of the pigment.

The coating solution for the protective layer may contain, if necessary, various additives such as a crosslinking agent, a lubricant, a stabilizer, an ultraviolet absorber, a dispersant, a defoaming agent, an antioxidant, a fluorescent dye, etc. that can be used for the thermosensitive recording layer.

The thermosensitive recording medium of the present invention may further have an undercoat layer between the support and the thermosensitive recording layer.

The undercoat layer comprises mainly a binder and a pigment. As the binder used for the undercoat layer, the binders shown above as the materials that can be used for the thermosensitive recording layer may be used. These binders may be used alone or in combination of two or more.

Any generally used pigment may be used as the pigment in the undercoat layer. As the pigment, for example, inorganic pigment, such as calcium carbonate, silica, zinc oxide, titanium oxide, aluminum hydroxide, magnesium hydroxide, calcined kaolin, clay, talc and the like may be used. These pigments may be used alone or in combination of two or more.

The amount of the pigments in the undercoat layer is ordinarily from 50 to 95 weight parts, preferably from 70 to 90 weight parts per 100 parts by weight of the total solid of the undercoat layer.

Various aids such as a dispersion agent, plasticizer, pH controlling agent, de-foaming agent, water retention agent, preservative, coloring dye, UV absorber and the like may be added to the undercoat layer, as required.

In the present invention, the method for coating the thermosensitive recording layer and other coating layers is not limited in particular, but any known conventional techniques may be used. The method for coating may be appropriately selected from off-machine coating machines and on-machine coating machines, which are equipped with coaters such as air knife coater, rod blade coater, bent blade coater, bevel blade coater, roll coater, curtain coater and the like.

The coating amounts of the thermosensitive recording layer and other coating layers are not limited in particular, but may be determined according to the required performance and the recording suitability.

The typical coating amount (in solid) of the thermosensitive recording layer is ordinarily in the range of from 2 to 12 $g/m^2$, the typical coating amount (in solid) of the undercoat layer is ordinarily in the range of from 1 to 15 $g/m^2$ and the typical coating amount (in solid) of the protective layer is ordinarily in the range of from 1 to 5 $g/m^2$, preferably from 1 to 3 $g/m^2$.

Furthermore, various technologies known in the thermosensitive recording medium field, such as a flattening treatment such as super calendaring and the like can be applied as needed after coating individual coating layers.

EXAMPLES

The following Examples illustrate the present invention, but the Examples are not intended to limit the scope of the present invention. In the following description, the terms parts and % indicate parts by weight and weight %, respectively.

The coating solutions and dispersions were prepared as described below.

[Preparation of Coating Solutions]

Undercoat layer coating solution was prepared by dispersing and stirring the following formulation:

Undercoat Layer Coating Solution

| | |
|---|---|
| Calcined kaolin (BASF Co.: Ansilex 90) | 100.0 parts |
| Styrene-butadiene copolymer latex (Zeon Corporation, ST5526, solid content: 48%) | 10.0 parts |
| Water | 50.0 parts |

Color developing agent dispersions (Solutions A1 to A7), a leuco dye dispersion (Solution B) and a sensitizer dispersion (Solution C) with the following formulations were separately wet ground using sand grinders until the average particle sizes were about 0.5 μm.

Color Developing Agent Dispersion 1 (Solution A1)

| | |
|---|---|
| 4-hydroxy-4'-benzyloxy-diphenylsulfone (Nicca Chemical Co., Ltd., BPS-MA3) | 6.0 parts |
| Aqueous solution of completely saponified polyvinyl alcohol (Kuraray Co., Ltd., PVA117, solid content: 10%) | 5.0 parts |
| Water | 1.5 parts |

Color Developing Agent Dispersion 2 (Solution A2)

| | |
|---|---|
| Urea-urethane-based compound represented by the formula 2 (Chemipro Kasei Kaisha, LTD., UU) | 6.0 parts |
| Aqueous solution of completely saponified polyvinyl alcohol (PVA117) | 5.0 parts |
| Water | 1.5 parts |

Color Developing Agent Dispersion 3 (Solution A3)

| | |
|---|---|
| 4,4'-dihidoroxy-diphenylsulfone (Nicca Chemical Co., Ltd., BPS44) | 6.0 parts |
| Aqueous solution of completely saponified polyvinyl alcohol (PVA117) | 5.0 parts |
| Water | 1.5 parts |

Color Developing Agent Dispersion 4 (Solution A4)

| | |
|---|---|
| 4-hydroxy-4'-n-propoxy-diphenylsulfone (Mitsubishi Chemical Corporation, TOMILAC KN) | 6.0 parts |
| Aqueous solution of completely saponified polyvinyl alcohol (PVA117) | 5.0 parts |
| Water | 1.5 parts |

Color Developing Agent Dispersion 5 (Solution A5)

| | |
|---|---|
| Diphenylsulfone crosslinked type compound (Nippon Soda Co., Ltd., D-90) | 6.0 parts |
| Aqueous solution of completely saponified polyvinyl alcohol (PVA117) | 5.0 parts |
| Water | 1.5 parts |

Color Developing Agent Dispersion 6 (Solution A6)

| | |
|---|---|
| Urea-based compound represented by the formula 8 (Mitsubishi Chemical Corporation, SU727) | 6.0 parts |
| Aqueous solution of completely saponified polyvinyl alcohol (PVA117) | 5.0 parts |
| Water | 1.5 parts |

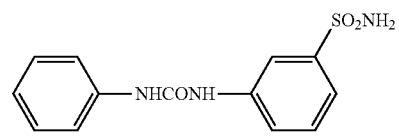

[Formula 8]

Color Developing Agent Dispersion 7 (Solution A7)

| | |
|---|---|
| 4-hydroxyphenyl-4'-phenoxy-phenylsulfone represented by the formula 9 | 6.0 parts |
| Aqueous solution of completely saponified polyvinyl alcohol (PVA117) | 5.0 parts |
| Water | 1.5 parts |

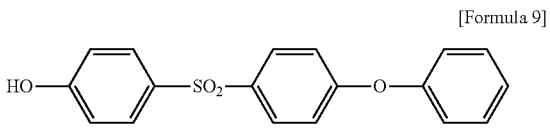

[Formula 9]

Leuco Dye Dispersion (Solution B)

| | |
|---|---|
| 3-Dibutylamino-6-methyl-7-anilinofluorane (Yamamoto Chemicals Inc., ODB-2) | 6.0 parts |
| Aqueous solution of completely saponified polyvinyl alcohol (PVA117) | 5.0 parts |
| Water | 1.5 parts |

Sensitizer Dispersion (Solution C)

| | |
|---|---|
| 1,2-bis(2-Methylphenoxy) ethane (Sanko Co. Ltd, KS232) | 6.0 parts |
| Aqueous solution of completely saponified polyvinyl alcohol (PVA117) | 5.0 parts |
| Water | 1.5 parts |

Next, these dispersions were blended in the proportion described below to prepare the thermosensitive recording layer coating solutions 1 to 9.

Thermosensitive Recording Layer Coating Solution 1

| | |
|---|---|
| Color developing agent dispersion (Solution A1) | 18.0 parts |
| Color developing agent dispersion (Solution A2) | 18.0 parts |
| Leuco dye dispersion (Solution B) | 18.0 parts |
| Sensitizer dispersion (Solution C) | 9.0 parts |
| Silica dispersion (Mizusawa Industrial Chemicals, Ltd., Mizukasil P-537, solid content: 25%) | 17.5 parts |
| Aqueous solution of completely saponified polyvinyl alcohol (PVA117) | 25.0 parts |

Thermosensitive Recording Layer Coating Solution 2

| | |
|---|---|
| Color developing agent dispersion (Solution A1) | 36.0 parts |
| Leuco dye dispersion (Solution B) | 18.0 parts |
| Sensitizer dispersion (Solution C) | 9.0 parts |
| Silica dispersion (Mizukasil P-537) | 17.5 parts |
| Aqueous solution of completely saponified polyvinyl alcohol (PVA117) | 25.0 parts |

Thermosensitive Recording Layer Coating Solution 3

| | |
|---|---|
| Color developing agent dispersion (Solution A2) | 36.0 parts |
| Leuco dye dispersion (Solution B) | 18.0 parts |
| Sensitizer dispersion (Solution C) | 9.0 parts |
| Silica dispersion (Mizukasil P-537) | 17.5 parts |
| Aqueous solution of completely saponified polyvinyl alcohol (PVA117) | 25.0 parts |

Thermosensitive Recording Layer Coating Solution 4

| | |
|---|---|
| Color developing agent dispersion (Solution A3) | 18.0 parts |
| Color developing agent dispersion (Solution A2) | 18.0 parts |
| Leuco dye dispersion (Solution B) | 18.0 parts |
| Sensitizer dispersion (Solution C) | 9.0 parts |
| Silica dispersion (Mizukasil P-537) | 17.5 parts |
| Aqueous solution of completely saponified polyvinyl alcohol (PVA117) | 25.0 parts |

Thermosensitive Recording Layer Coating Solution 5

| | |
|---|---|
| Color developing agent dispersion (Solution A4) | 18.0 parts |
| Color developing agent dispersion (Solution A2) | 18.0 parts |
| Leuco dye dispersion (Solution B) | 18.0 parts |
| Sensitizer dispersion (Solution C) | 9.0 parts |
| Silica dispersion (Mizukasil P-537) | 17.5 parts |
| Aqueous solution of completely saponified polyvinyl alcohol (PVA117) | 25.0 parts |

Thermosensitive Recording Layer Coating Solution 6

| | |
|---|---|
| Color developing agent dispersion (Solution A5) | 18.0 parts |
| Color developing agent dispersion (Solution A2) | 18.0 parts |
| Leuco dye dispersion (Solution B) | 18.0 parts |
| Sensitizer dispersion (Solution C) | 9.0 parts |
| Silica dispersion (Mizukasil P-537) | 17.5 parts |
| Aqueous solution of completely saponified polyvinyl alcohol (PVA117) | 25.0 parts |

Thermosensitive Recording Layer Coating Solution 7

| | |
|---|---|
| Color developing agent dispersion (Solution A1) | 18.0 parts |
| Color developing agent dispersion (Solution A6) | 18.0 parts |
| Leuco dye dispersion (Solution B) | 18.0 parts |
| Sensitizer dispersion (Solution C) | 9.0 parts |
| Silica dispersion (Mizukasil P-537) | 17.5 parts |
| Aqueous solution of completely saponified polyvinyl alcohol (PVA117) | 25.0 parts |

Thermosensitive Recording Layer Coating Solution 8

| | |
|---|---|
| Color developing agent dispersion (Solution A1) | 18.0 parts |
| Color developing agent dispersion (Solution A2) | 18.0 parts |
| Leuco dye dispersion (Solution B) | 18.0 parts |
| Sensitizer dispersion (Solution C) | 9.0 parts |
| Silica dispersion (Mizukasil P-537) | 7.5 parts |
| Aqueous solution of completely saponified polyvinyl alcohol (PVA117) | 25.0 parts |

Thermosensitive Recording Layer Coating Solution 9

| | |
|---|---|
| Color developing agent dispersion (Solution A7) | 18.0 parts |
| Color developing agent dispersion (Solution A2) | 18.0 parts |
| Leuco dye dispersion (Solution B) | 18.0 parts |
| Sensitizer dispersion (Solution C) | 9.0 parts |
| Silica dispersion (Mizukasil P-537) | 17.5 parts |
| Aqueous solution of completely saponified polyvinyl alcohol (PVA117) | 25.0 parts |

Next, protective layer coating solution was prepared by mixing the following formulations:
Protective Layer Coating Solution

| | |
|---|---|
| Aluminum hydroxide dispersion (Martinsberg: Martifin OL, solid content: 50%) | 9.0 parts |
| Carboxyl modified polyvinyl alcohol solution (Kuraray Co., Ltd.: KL318, solid content: 10%) | 30.0 parts |
| Polyamide epichlorohydrin resin (Seiko PMC: WS4030, solid content: 25%) | 4.0 parts |
| Zinc stearate dispersion (Chukyo Yushi Co., Ltd.: HydrinZ-7-30, solid content: 30%) | 2.0 parts |

Example 1

The undercoat layer coating solution was applied on one side of a support (groundwood free paper with a basis weight of 47 g/m$^2$) by using a bent blade coater with a coating amount (in solid) of 10.0 g/m$^2$, and was dried to prepare an undercoated paper.

The thermosensitive recording layer coating solution 1 was applied on the undercoat layer of the undercoated paper by using a rod blade coater with a coating amount (in solid) of 6.0 g/m$^2$ and was dried and super calendared so that the smoothness was 500-1,000 seconds to prepare a thermosensitive recording medium.

Example 2

A thermosensitive recording medium was prepared in the same manner as described in Example 1 using the thermosensitive recording layer coating solution 1 with the exception of changing the amount of the color developing agent dispersion (Solution A1) to 31.5 parts, and changing the amount of the color developing agent dispersion (Solution A2) to 4.5 parts.

Example 3

A thermosensitive recording medium was prepared in the same manner as described in Example 1 using the thermosensitive recording layer coating solution 1 with the exception of changing the amount of the color developing agent dispersion (Solution A1) to 25.5 parts, and changing the amount of the color developing agent dispersion (Solution A2) to 10.5 parts.

Example 4

The undercoat layer coating solution was applied on one side of a support (groundwood free paper with a basis weight of 47 g/m$^2$) by using a bent blade coater with a coating amount (in solid) of 10.0 g/m$^2$, and was dried to prepare an undercoated paper.

The thermosensitive recording layer coating solution 8 was applied on the undercoat layer of the undercoated paper by using a rod blade coater with a coating amount (in solid) of 6.0 g/m$^2$ and was dried and super calendared so that the smoothness was 500-1,000 seconds to prepare a thermosensitive recording layer coated paper.

Then the protective layer coating solution was applied on the thermosensitive recording layer of the thermosensitive recording layer coated paper by using a rod blade coater with a coating amount (in solid) of 2.0 g/m² and was dried to prepare a thermosensitive recording medium.

Example 5

A thermosensitive recording medium was prepared in the same manner as described in Example 4 using the thermosensitive recording layer coating solution 8 with the exception of changing the amount of the color developing agent dispersion (Solution A1) to 31.5 parts, and changing the amount of the color developing agent dispersion (Solution A2) to 4.5 parts.

Comparative Example 1

A thermosensitive recording medium was prepared in the same manner as described in Example 1 using the thermosensitive recording layer coating solution 2 in place of the thermosensitive recording layer coating solution 1.

Comparative Example 2

A thermosensitive recording medium was prepared in the same manner as described in Example 1 using the thermosensitive recording layer coating solution 3 in place of the thermosensitive recording layer coating solution 1.

Comparative Example 3

A thermosensitive recording medium was prepared in the same manner as described in Example 1 using the thermosensitive recording layer coating solution 4 in place of the thermosensitive recording layer coating solution 1.

Comparative Example 4

A thermosensitive recording medium was prepared in the same manner as described in Example 1 using the thermosensitive recording layer coating solution 5 in place of the thermosensitive recording layer coating solution 1.

Comparative Example 5

A thermosensitive recording medium was prepared in the same manner as described in Example 1 using the thermosensitive recording layer coating solution 6 in place of the thermosensitive recording layer coating solution 1.

Comparative Example 6

A thermosensitive recording medium was prepared in the same manner as described in Example 1 using the thermosensitive recording layer coating solution 7 in place of the thermosensitive recording layer coating solution 1.

Comparative Example 7

A thermosensitive recording medium was prepared in the same manner as described in Example 1 using the thermosensitive recording layer coating solution 1 with the exception of changing the amount of the color developing agent dispersion (Solution A1) to 4.5 parts, and changing the amount of the color developing agent dispersion (Solution A2) to 31.5 parts.

Comparative Example 8

A thermosensitive recording medium was prepared in the same manner as described in Example 1 using the thermosensitive recording layer coating solution 9 in place of the thermosensitive recording layer coating solution 1.

The prepared thermosensitive recording media were evaluated as below.

<Color Developing Property (Recorded Density)>

A checkerboard pattern was painted on the prepared thermosensitive recording media by using a thermosensitive recording medium print tester (Ohkura Engineering Co., Ltd. TH-PMD equipped with a thermal head by Kyocera Co.) at applied energy of 0.35 mJ/dot and printing speed of 50 mm/sec. The density of the printed portion was measured by using Macbeth Densitometer (RD-914, with Amber filter) to evaluate the color developing property (recorded density).

<Heat Resistance in Blank Portion>

The prepared thermosensitive recording medium was treated in an environment of 80 degree C. for 24 hours and stored in an environment of 23 degree C., 50% RH for three hours. The color density of non-printed portion (i.e. blank portion) was measured by using Macbeth Densitometer (RD-914, with Amber filter) and the background color value was calculated from the difference between the color densities before and after the treatment. The heat discoloration resistance in the blank portion was evaluated on the following criteria.

Background color value=(color density of the non-printing portion after the treatment)−(color density of the non-printing portion before the treatment)

Excellent: The background color value is less than 0.1

Good: The background color value is 0.1 or higher and less than 0.3

Fair: The background color value is 0.3 or higher and less than 0.5

Poor: The background color value is 0.5 or higher

<Bar Code Readability>

The prepared thermosensitive recording medium was treated in the following two environments for 24 hours and stored in an environment of 23 degree C., 50% RH for three hours.

(1) 80 degree C.

(2) 50 degree C., 90% RH

Then a bar code (CODE39) was printed on the thermosensitive recording medium by using a label printer (140XiIII manufactured by Zebra Co., Ltd.) at print level of plus 10 and print speed of 15.2 cm per sec. (6 inches per sec.). Then the printed bar code was read by a bar code tester (Honeywell, QCPC600, light source: 640 nm). The bar code readability was evaluated according to the symbol grades of the ANSI standard as in the manner described below.

Symbol Grade: The bar code is divided into ten pieces in the direction vertical to the bar. The reading test is conducted once each to average the results. And the averaged bar code readability is rated as below:

Rating: (Excellent) A>B>C>D>F (Poor)

The evaluation results are shown in Table 1.

TABLE 1

| | Color developing agents | | Color developing agent 2/Color developing agent 1 | Protective layer | Color developing property | Heat resistance in blank portion | Bar code readability (1) | (2) |
|---|---|---|---|---|---|---|---|---|
| | 1 | 2 | | | | | | |
| Example 1 | BPS-MA3 | UU | 1.0 | NA | 1.30 | excellent | B | B |
| Example 2 | BPS-MA3 | UU | 0.14 | NA | 1.32 | excellent | B | B |
| Example 3 | BPS-MA3 | UU | 0.41 | NA | 1.31 | excellent | B | B |
| Example 4 | BPS-MA3 | UU | 1.0 | installed | 1.23 | excellent | B | B |
| Example 5 | BPS-MA3 | UU | 0.14 | installed | 1.26 | excellent | B | B |
| Comparative Example 1 | BPS-MA3 | — | — | NA | 1.35 | good | C | D |
| Comparative Example 2 | — | UU | — | NA | 0.88 | poor | F | F |
| Comparative Example 3 | BPS44 | UU | 1.0 | NA | 1.16 | fair | D | D |
| Comparative Example 4 | TOMILAC KN | UU | 1.0 | NA | 1.24 | good | C | D |
| Comparative Example 5 | D90 | UU | 1.0 | NA | 1.25 | poor | F | F |
| Comparative Example 6 | BPS-MA3 | SU727 | 1.0 | NA | 1.05 | excellent | C | C |
| Comparative Example 7 | BPS-MA3 | UU | 7.0 | NA | 1.25 | good | C | C |
| Comparative Example 8 | ** | UU | 1.0 | NA | 1.24 | fair | F | F |

** 4-hydroxyphenyl-4'-phenoxyphenylsulfone

It is obvious from Table 1 that the thermosensitive recording medium is excellent in color developing property, especially excellent in bar code readability, under severe environment, when using a sulfone compound represented by the general formula 1 and an urea-urethane-based compound represented by the general formula 2 in a specific ratio as the electron accepting color developing agent, in the thermosensitive recording layer of the thermosensitive recording medium.

What is claimed is:

1. A thermosensitive recording medium having a thermosensitive recording layer comprising a colorless or pale colored electron donating leuco dye and an electron accepting color developing agent on a substrate, wherein the thermosensitive recording layer contains 4-hydroxy-4'-benzyloxy diphenyl sulfone and an urea-urethane-based compound represented by the general

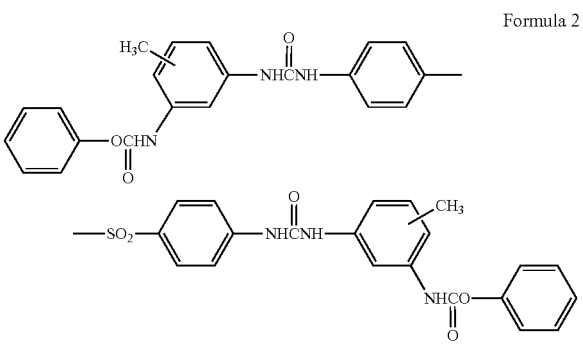

Formula 2 as the electron accepting color developing agent, wherein the content of the urea-urethane-based compound represented by the general Formula 2 is 0.14 parts by weight to 1.0 part by weight per 1 part by weight of the 4-hydroxy-4'-benzyloxy diphenyl sulfone.

* * * * *